United States Patent [19]

Vuong et al.

[11] Patent Number: 5,235,214

[45] Date of Patent: Aug. 10, 1993

[54] PRIME SWITCH FOR LIQUID DISPENSER PUMP

[75] Inventors: Nhon T. Vuong, Lombard; Edward M. Jones, Hoffman Estates; Richard A. Kamysz, Roselle, all of Ill.

[73] Assignee: Sloan Valve Company, Franklin Park, Ill.

[21] Appl. No.: 730,457

[22] Filed: Jul. 16, 1991

[51] Int. Cl.⁵ .................. F04B 49/00; B67D 5/08; H01H 35/00
[52] U.S. Cl. .................. 307/116; 222/52; 222/639; 361/170; 417/12; 417/18
[58] Field of Search .......... 222/52, 63, 639, 566; 417/1, 278, 279, 290, 305, 12, 18, 44, 199.2, 200; 250/221; 307/311, 117, 141.4, 116; 340/556; 361/173, 190, 198, 203, 170

[56] References Cited

U.S. PATENT DOCUMENTS

| 4,921,150 | 5/1990 | Lagergren et al. | 222/639 |
| 4,938,384 | 7/1990 | Pilolla et al. | 222/52 |
| 4,946,072 | 8/1990 | Albert et al. | 222/105 |

Primary Examiner—A. D. Pellinen
Assistant Examiner—Richard T. Elms
Attorney, Agent, or Firm—Kinzer, Plyer, Dorn, McEachran & Jambor

[57] ABSTRACT

An electric circuit for operating a toilet room soap dispenser includes a sensor and an electric operator, with the sensor providing an operating signal in response to the presence of a person positioned to use the soap dispenser The electric operator, which is responsive to a signal from the sensor, provides a measured amount of soap from the soap dispenser. The improvement is specifically directed to a prime circuit for causing a predetermined number of operations of the electric operator to prime the soap dispenser for normal use, after refilling the soap supply.

8 Claims, 2 Drawing Sheets

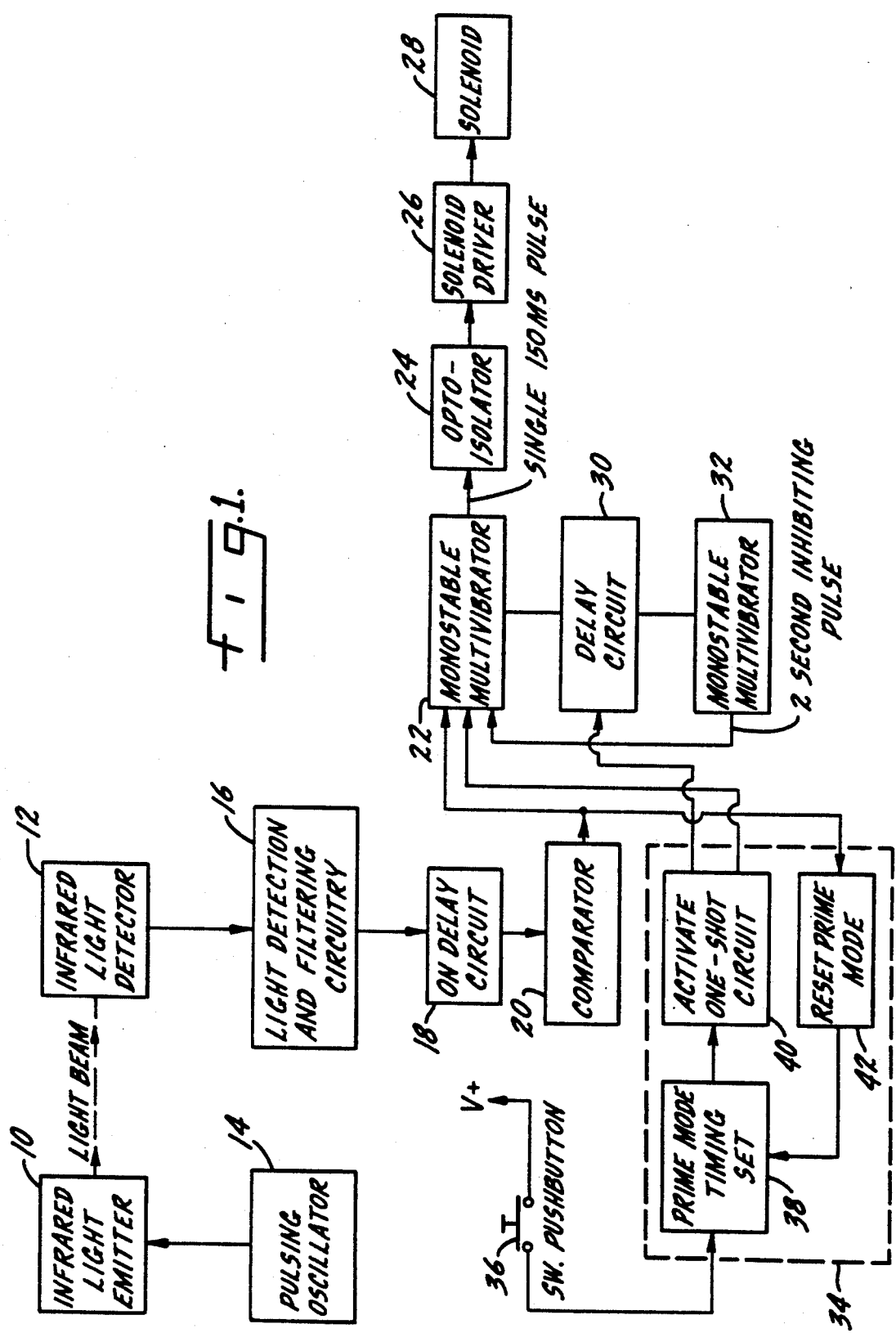

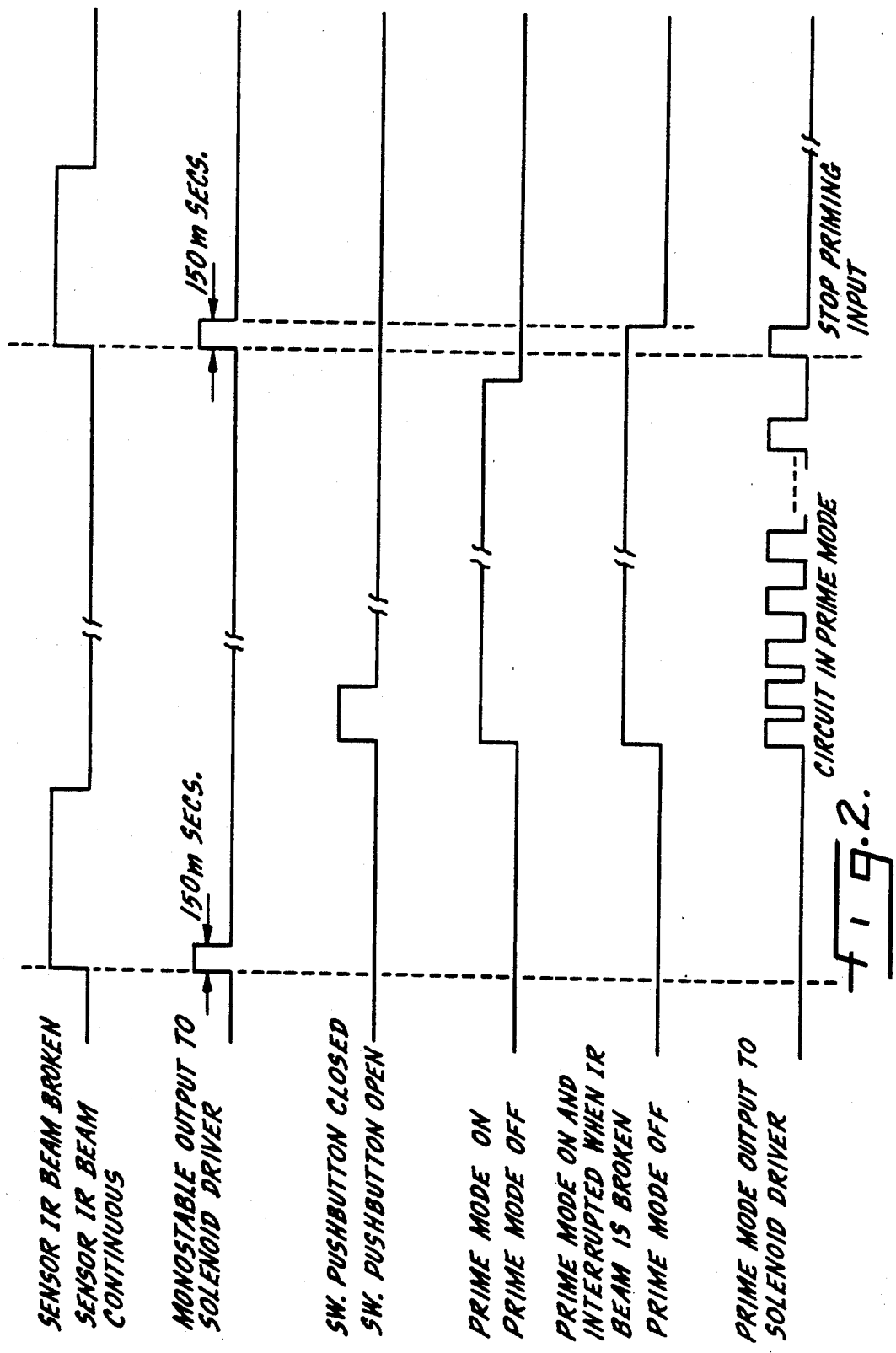

PRIME SWITCH FOR LIQUID DISPENSER PUMP

THE FIELD OF THE INVENTION

This invention relates to automatic soap dispensers of the type commonly found in public washrooms and particularly to a sensor-operated soap dispenser. More specifically, the invention relates to a circuit for use in priming the soap dispenser pump after refilling the soap supply.

DESCRIPTION OF THE RELATED ART

U.S. Pat. No. 4,938,384 assigned to Sloan Valve Company, the assignee of the present application, discloses an infrared sensor-operated soap dispenser. The present invention is a specific improvement on the sensor-operated soap dispenser of the '384 patent in that it adds an electric circuit for automatic priming of the soap dispenser pump after refilling the soap supply.

SUMMARY OF THE INVENTION

The present invention relates to sensor-operated soap dispensers and specifically to a circuit for use in priming the soap dispenser pump after refilling in the soap supply.

A primary purpose of the invention is a soap dispenser electric operating circuit which, upon activation thereof, provides a predetermined number of operations of the soap dispenser electric operator to prime the soap dispenser for subsequent use.

Another purpose is a soap dispenser prime circuit as described, including a manual switch to initiate operation of the prime circuit, with the prime circuit providing a predetermined number of operating pulses for the soap dispenser electric operator.

Another purpose is a soap dispenser electric circuit as described in which prime circuit operation can be terminated before the completion of its operating cycle by utilizing the soap dispenser sensor.

Other purposes will appear in the ensuing specification, drawings and claims.

BRIEF DESCRIPTION OF THE DRAWINGS

The invention is illustrated diagrammatically in the following drawings wherein:

FIG. 1 is an electric diagram illustrating the soap dispenser electric operating circuit disclosed herein, and FIG. 2 is a timing diagram illustrating the operation of the circuit in FIG. 1.

DESCRIPTION OF THE PREFERRED EMBODIMENT

U.S. Pat. No. 4,938,384 owned by Sloan Valve Company, the assignee of the present invention, discloses an automatic soap dispenser utilizing an infrared sensor to provide a measured amount of soap. The disclosure of that patent is incorporated by reference herein. FIG. 5 of the '384 patent specifically shows the electric circuit for operating the soap dispenser. FIG. 1 herein utilizes the FIG. 5 circuit of the '384 patent and adds a prime circuit for use in priming the soap dispenser after refilling the soap supply.

In the '384 patent, column 4, beginning at line 58, there is a description of the established practice to prime the soap dispenser which consists of repeated operation of the pump by a user placing hands beneath the nozzle to break the light beam. The present invention provides a circuit for automatically priming the soap dispenser pump of the '384 patent.

In FIG. 1 an infrared light emitter is indicated at 10 and provides a beam of infrared light directed toward an infrared light detector 12. A pulsing oscillator 14 controls operation of the light emitter which will be intermittently energized. The detector 12, when energized by light from emitter 10, provides a signal to light detection and filter circuitry 16 which includes an integrator for effectively filtering any ambient light received from the detector to provide a clean output signal representing the detection of a continuous light beam indicative of a condition in which no user's hands are present to break the beam.

An on delay circuit 18 is connected to detection circuit 16 and the continuous application of output signals from detection circuit 16 will not cause any of the remaining individual circuits illustrated in FIG. 1 to be operated. When the light beam is broken, the output signal from detection circuit 16 changes amplitude to which on delay circuit 18 responds. Note the timing diagram of FIG. 2 indicating the change in amplitude when the sensor infrared beam is broken. On delay circuit 18 does not provide an output until it has received an input from detection circuit 16 for a minimum period, for example 50 milliseconds. This renders the system immune to transients and other abnormalities not brought about by the presence of a user at the soap dispenser.

Assuming that there is an interruption of the sensor beam at the end of the 50 millisecond period of on delay circuit 18, there is an output signal to comparator 20 which compares the received signal to a reference or threshold voltage to provide a trigger signal for application to monostable multivibrator 22.

Monostable circuit 22 also provides an output to opto-isolator 24 which isolates the low voltage sensor circuit from the high voltage circuit which is utilized to operate the solenoid. The pulse from monostable circuit 22 will be of a set duration, for example 150 milliseconds, as shown on the timing diagram. This pulse is provided through the opto-isolator to the solenoid driver 26 which in turn will cause high voltage to be applied to solenoid 28 for operation thereof.

Because the solenoid may overheat if it is repeatedly energized, for example by vandalism or the like, the operation of the solenoid is effectively locked out for a predetermined minimum time interval following energization. This is brought about by connecting monostable circuit 22 through a delay circuit 30 to a second monostable circuit 32 which produces an output pulse of two seconds duration. Monostable circuit 32 is connected to the input of monostable circuit 22 to inhibit the operation of monostable circuit 22 for the two seconds immediately following the trailing edge of the 150 millisecond pulse which is the output of circuit 22. This prevents operation of the solenoid for at least two seconds following a previous operation.

The circuit to prime the soap dispenser is indicated generally at 34 and includes a manually operable pushbutton 36 which will be at a location for use by maintenance personnel. When switch 36 is closed, it applies a voltage to prime mode timing circuit 38. As indicated on the timing diagram, the prime mode circuit will be placed in an ON condition, upon switch closure, and will provide a series of output pulses to an activate circuit 40. Circuit 40 will provide this series of output pulses to the input of monostable circuit 22, which output pulses resemble the input the monostable circuit normally receives as a result of an interruption in the infrared beam between the emitter and detector. The result of such input to monostable circuit 22 will be to similate the presence of a user in front of the soap dispenser. The pulses from prime mode circuit 38 will be predetermined in number, depending upon the size of the soap dispenser and the tube distance between the soap supply and the soap dispenser. But for each installation, there will be a set number of pulses provided to monostable circuit 22. This is indicated at the bottom line in the timing diagram of FIG. 2. The prime circuit pulses will be equal in width, but the intervals between pulses will gradually increase over the period of the priming pulses. This is to avoid overheating the solenoid from continuous operation.

There is also an output from activate one-shot circuit 40 to delay circuit 30 which has the effect of inhibiting operation of the delay circuit so as to permit the rapid and continuous operation of the solenoid to prime the soap dispenser.

There may be instances in which it is desired to stop the priming circuit or to terminate its operation prior to the completion of the prime cycle and this can be done by a reset prime mode circuit 42 which receives an input from the output of comparator 20 and has its output connected to prime mode timing circuit 38. The signal from reset circuit 42 will stop output pulses from timing circuit 38 at the trailing edge of the 150 millisecond pulse from comparator 20. If, during the prime cycle, the light beam is broken between the emitter and the detector, there will be an output from comparator 20 and this output will have the effect of resetting the prime circuit or effectively terminating its operation.

The present invention provides a means for priming a soap dispenser so that there will be soap available at its output as soon as a user breaks the light beam from the detector to the emitter. The effect of the prime circuit is to cause operation of the soap dispenser solenoid for a given number of operating cycles consistent with the amount of soap necessary to fill up the tube between the soap supply and the soap dispenser and the amount of soap necessary to have soap available at the output of the dispenser. The prime circuit is operated by a manual switch and will provide a given number of pulses to simulate operation of the sensor. The solenoid will thus be operated through a given number of cycles sufficient to provide soap in the supply lines as described. The output pulses from the prime circuit will be equal in pulse duration, but will have a gradually increasing interval between pulses so as to not overheat the solenoid. The delay circuit which normally prevents excessive operation of the solenoid is inhibited during the prime cycle. The prime cycle can be terminated at any time by the reset circuit which is responsive to the breaking of the infrared beam between the emitter and detector.

Whereas, the preferred form of the invention has been shown and described herein, it should be realized that there may be many modifications, substitutions and alterations thereto.

The embodiments of the invention in which an exclusive property or privilege is claimed are defined as follows:

1. An electric circuit for operating a toilet room soap dispenser including:
   sensor means providing an operating signal in response to the presence of a person positioned to use a soap dispenser,
   an electric operator which, upon activation, causes the soap dispenser to provide a measured amount of soap,
   circuit means connecting the sensor means and the electric operator whereby an operating signal from the sensor will cause activation of the electric operator, said connecting circuit means including means for providing a pulse of predetermined duration for activation of the electric operator,
   the improvement comprising prime circuit means, including a prime mode circuit for providing a predetermined number of pulses to said circuit means for providing a pulse of predetermined duration, manually operable switch means for causing activation of said prime mode circuit whereby a predetermined number of pulses are provided to said circuit means for providing a pulse of predetermined duration to cause a predetermined number of activation of said electric operator to prime the soap dispenser for normal use.

2. The circuit of claim 1 further characterized in that the means for providing a pulse of predetermined duration is a monostable circuit.

3. The circuit of claim 2 further characterized by and including a delay circuit inhibiting operation of said monostable circuit for a predetermined period after actuation thereof.

4. The circuit of claim 3 further characterized in that said prime circuit is connected to and inhibits operation of said delay circuit during the period that said prime circuit is causing a predetermined number of activations of said electric operator.

5. The circuit of claim 1 further characterized in that said prime circuit means provides pulses at non-uniform intervals.

6. The circuit of claim 5 further characterized in that closure of said switch means initiates operation of said prime mode circuit, with said prime mode circuit pulse intervals increasing after initiation of said prime mode circuit.

7. The circuit of claim 1 further characterized by and including means for terminating operation of said prime mode circuit before it has provided said predetermined number of pulses.

8. The circuit of claim 7 further characterized in that the means for terminating operation of said prime mode circuit is responsive to an operating signal from said sensor means.

* * * * *